United States Patent
Falkehag

[15] 3,697,497
[45] Oct. 10, 1972

[54] HEXAMETHYLENE TETRAMINE DERIVATIVES OF ALKALI LIGNINS

[72] Inventor: Sten I. Falkehag, Mt. Pleasant, S.C.

[73] Assignee: Westvaco Corporation, New York, N.Y.

[22] Filed: Sept. 17, 1970

[21] Appl. No.: 73,197

[52] U.S. Cl. .............................. 260/124 A, 260/814
[51] Int. Cl. ............................................. C07g 1/00
[58] Field of Search ............ 260/124 R, 124 A, 124 B

[56] References Cited

OTHER PUBLICATIONS

Brauns et al. The Chemistry of Lignin–Supplement Volume, 556–7 (1960) QD 321 B 78 1949–58.
Sokolova et al. CA, 64, 6892 (1966).
Borisek CA, 46, 4225, (1952).
Sokolova, Soviet Inventions Illustrated–Chemical, June, 1966, 10.

*Primary Examiner*—Lewis Gotts
*Assistant Examiner*—D. R. Phillips
*Attorney*—Ernest B. Lipscomb and Richard L. Schmalz

[57] ABSTRACT

Hexamethylene tetramine derivatives of alkali lignins are formed by reacting, at a temperature between 70° C. and 180° C., 0.17 to 2.0 moles of a hexamethylene tetramine forming solution with 1 mole of an alkali lignin solubilized in an alkaline solution. These derivatives, characterized by having a high molecular weight and a high melting point, are useful as stabilizers in rubber emulsion, high molecular weight resin-like fillers and may be converted into products having large surface areas.

5 Claims, No Drawings

HEXAMETHYLENE TETRAMINE DERIVATIVES OF ALKALI LIGNINS

This invention relates to novel derivatives of alkali lignins. More particularly, this invention relates to hexamethylene tetramine derivatives of alkali lignin that are useful as stabilizers and emulsifiers and are easily dried to lignins having large surface area.

During the past 10 to 15 years many new materials having high surface area have been marketed as dispersants of pigments in latex paints, stabilizers of emulsions, dispersants for pesticides and fillers in drugs. These materials include silicas, silicates and aluminas which generally have surface areas of 150–400 square meters per gram and sell for high prices. The hexamethylene tetramine modified lignins of this invention, when dried into products having high surface area, perform satisfactorily in place of these materials at a much lower price. These lignin derivatives may be dried by several methods which yield high surface areas including U. S. Pat. No. 3,223,697 and co-pending U. S. applications Ser. No. 806,684 and Ser. No. 12,433. Although these drying processes are adaptable to various lignin modifications, they are particularly suitable for use with the products of this invention.

A number of lignin modifications have been made through the years with various objectives in mind and varying degrees of success. The objectives of these modifications can be divided into three main groups; increase in melting point of lignin by cross-linking, changes in surface reactivity and changes in behavior of lignins during coprecipitation and drying.

It is therefore a general object of this invention to provide a novel low cost, high melting point, high molecular weight lignin derivative. Another object of this invention is to provide a cationic lignin derivative, particularly suitable for making lignins having a large surface area. A further object of this invention is to provide an all organic compound having a large surface area and surface reactivity, a low cost and capable of substitution for large surface area inorganic compounds. Other objects, features and advantages will become evident from the following disclosure.

According to the present invention it is possible to obtain lignin derivatives, which are capable of obtaining high surface areas upon proper drying, by reacting in an aqueous alkaline solution an alkali lignin with hexamethylene tetramine. The lignins employed in this invention are of the type known as "alkali lignin" obtained from the black liquor formed during the manufacture of pulp by the sulfate or "kraft" process. The alkali lignins are insoluble in water, but soluble in alkali. It is not necessary to start with an alkali lignin per se as modified alkali lignins, such as the demethylated lignins made according to U.S. Pat. No. 2,976,273, may be used.

The products of this invention are made by dissolving an alkali lignin or modified alkali lignin in an alkaline solution. Any alkali metal solution such as sodium hydroxide, or ammonia may be used. When using an ammonia solution for solubilization it is preferable to add some alkali metal hydroxide. Solubilizing the lignin in all ammonia solution is preferred when large surface area products are to be produced so that no inorganic material will be present during drying or remain after drying. Only sufficient ammonia or alkali metal is needed as is necessary for solubilizing the lignin. The lignin derivatives of this invention dried from sodium hydroxide solutions are soluble in water; whereas the lignin derivatives from ammonia solutions are not water-soluble.

To solubilized lignin in alkali or ammonia solution is added from 0.17 to 2.0 moles of the cyclic hexamethylene tetramine. The reaction mixture may be heated over the range from 70° C. to 180° C. The time required for reaction varies with the temperature; however, at least two hours are generally required for the reaction to be completed. The preferred reaction in an alkali metal solution would be one mole of hexamethylene tetramine per mole of lignin, which lignin had been solubilized in 6.0 moles of ammonia and 2.0 moles of sodium hydroxide per mole of lignin. When an all ammonia solution is used 10–20 moles of ammonia per mole of lignin is preferred. The preferred reaction is a temperature of 160° C. and a reaction time of 3 hours. Although the mechanism of this reaction is not fully understood, it is believed that the hexamethylene tetramine reacts with the ortho positions of the free phenolic group in the lignin to yield a cross-linked polymer with great thermal resistance and capability of providing high surface area when dried under the unique drying conditions described above.

It is known that the wet swollen particles of unmodified alkali lignin, as present after precipitation at low temperature, are extremely sensitive to cold flow and coalescence on removal of water and that coalescence of the lignin particles takes place during drying. The temperature where such a coalescence in a slurry starts to be important is defined as the wet melting point of the material. A wet lignin treated above that temperature can be dried without giving complete coalescence, e.g., it dries to a powder. The wet melting point of alkali lignin varies between 70° C. to 80° C.; whereas hexamethylene tetramine modified lignins made according to the process of this invention have wet melting points of from 150° C. to 200° C. Another important characteristic of the modified lignins of this invention is that they are cationic. These cationic or "-positive" lignins have an isoelectric point at a relatively high pH (4.7–7) and are highly positive at low pH and negative at pH's above 7. It is thought that the nitrogen containing groups of these products will protonize giving the positive charge. Cationic small particle size lignin is especially useful in achieving stabilized rubber emulsions without coagulation at acid pH's.

The practice of this invention may clearly be seen in the following examples.

EXAMPLE 1

Several samples of the product of this invention were made by dissolving an alkali lignin in an aqueous ammonical solution. To this solution was added hexamethylene tetramine at varying mole ratios. The reaction time and temperature are shown in the table below. The results were measured by determining the amount of cross-linking effected in terms of nitrogen content.

| Sample | Moles $NH_3$/1000 gms. Lignin | Mole Hexa/1000 gms. Lignin | Temp. (°C.) | Time (hrs.) | Nitrogen Content, % |
|---|---|---|---|---|---|
| 1 | 13.2 | 0 | 130 | 3 | 0.56 |
| 2 | 10 | 0.5 | 100 | 5 | 2.11 |

| 3 | 10   | 1 | 100 | 5 | 2.06 |
| 4 | 82.4 | 1 | 170 | 3 | 3.82 |
| 5 | 10   | 2 | 170 | 3 | 4.25 |
| 6 | 65.9 | 2 | 170 | 3 | 5.42 |

These results show the increase in nitrogen content at varying moles ratios of hexamethylene tetramine to lignin (samples 1–5) over the reaction without hexamethylene tetramine (sample 6) in an ammonical solution.

EXAMPLE 2

Alkali lignin (3600 grams dry ash free weight) was slurried in 14.4 Kg. of water in 5 gallon reactor. To this slurry 432 grams, 50% NaOH (1.5 moles/1,000 g lignin) and 1250 grams 29.4% $NH_3$ (6 moles/1,000 g lignin) were added at 80° C. and the mixture stirred for 10 minutes. Then 252 grams hexamethylene tetramine (0.5 moles/1000 g lignin) was added, the reactor closed and the temperature raised to 100° C. and kept at that temperature for 6 hours. The $NH_3$ was distilled off until the pH was about 10. Water was added to keep concentration about constant. Titration indicated about 1.9 moles of alkali per 1,000 g lignin after the distillation. Solids after distillation: 16.6 percent. This lignin derivative was found to have a nitrogen content of 1.4 moles N/1,000 g lignin, to be completely acetone insoluble, had an isoelectric point at pH 5 and a wet melting point of 140° C.

EXAMPLE 3

Alkali lignin (2,000 grams dry ash free weight) was slurried in 16.2 Kg. water in 5 gallon reactor. To this slurry 320 grams, 50% NaOH (2 moles/1,000 g lignin) and 1,160 grams 29.4% $NH_3$ (10 moles/1,000 g lignin) were added at 80° C. and the mixture stirred for 10 minutes. To this 280 grams hexamethylene tetramine (1 mole/1,000 g lignin) was added, the reactor closed and the temperature raised to 160° C. and kept at 157°–160° C. for 3 hours. No precipitation could be detected. The $NH_3$ was distilled off down to pH 10.1. Solids after distillation: 13.3 percent. Wet melting point 190° C. and the nitrogen content was 2.8 percent.

EXAMPLE 4

The procedure of Example 1 was followed except that a demethylated alkali lignin was used.

| Sample | Moles $NH_3$/ 1000 gms. Lignin | Mole Hexa/ 1000 gms. Lignin | Temp. (°C.) | Time (hrs.) | Nitrogen Content,% |
|---|---|---|---|---|---|
| 9  | 14.7 | 0.17 | 100 | 3 | 0.89 |
| 10 | 14.7 | 0.33 | 100 | 3 | 1.68 |
| 11 | 14.4 | 1.7  | 100 | 3 | 3.65 |

EXAMPLE 5

To clearly illustrate the ability of the products of this invention to form large surface area products, the following hexamethylene tetramine alkali lignins were made. Each of the reaction products had a total solids content varying from 12.6 to 25.0 percent by weight. From a solution of each sample were taken aliquots of approximately 230 grams. Each aliquot was diluted with 1,000 grams of water and thoroughly mixed. Then 750 grams of varsol were added and the mixture agitated for 1 minute to form an oil-in-water emulsion. A solution of 30 ml. of acetic acid in 500 ml. of water was then added to the emulsion and agitated. The resulting paste was then dried for 8 hours at 230° F. The surface area of the dried products was determined by the Brunauer-Emmet-Teller (BET) method using nitrogen adsorption. The results are shown in the table below.

| Sample | Moles NaOH 1000 gms Lignin | Moles $NH_3$ the 1000 gms Lignin | Moles Hexa/ 1000 gms Lignin | Time and Temp. Record (hrs.) (°F.) | Surface Area $M^2/g$ |
|---|---|---|---|---|---|
| 12 | 2.0  | 9.4  | 1    | 3 at 315 | 96.2 |
| 13 |      | 19.6 | 0.95 | 2 at 175<br>2 at 230<br>1 at 320 | 144.6 |
| 14 | 0.50 | 10   | 1    | 0.2 at 130–250<br>0.3 at 250–330 | 124.7 |
| 15 |      |      | 1    | 1 at 140–155<br>2.5 at 239–245 | 148.0 |

The lignin derivatives were tan, powdery products and the results show the surface area ranged from 96.2 $m^2$/gm to 148.0 $m^2$/gm. This is quite large compared to conventionally spray dried acid free alkali lignin, which generally has a surface area of from 1 to 5 meters square per gram.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. Derivatives of lignin obtained by reacting in an alkaline solution an alkali lignin with from 0.17 to 2.0 moles of hexamethylene tetramine per mole of lignin at a temperature between 70° and 180° C., said derivative dried to form products having large surface areas.

2. The derivatives of claim 1 wherein said alkaline solution is an aqueous ammonical solution.

3. The derivatives of claim 1 wherein said alkali lignin is a demethylated lignin.

4. The derivatives of claim 1 wherein said derivatives have a wet melting point of from 150° to 220° C.

5. The process of producing large surface area lignin derivatives which comprises, reacting in an aqueous medium an alkali lignin with from 0.17 to 2.0 moles of hexamethylene tetramine per mole of lignin at a temperature between 70° and 180° C., mixing said product with varsol and acetic acid, and drying said mixture.

* * * * *

PO-1050
(5/69)

UNITED STATES PATENT OFFICE
CERTIFICATE OF CORRECTION

Patent No. 3,697,497               Dated   October 10, 1972

Inventor(s) Sten I. Falkehag

It is certified that error appears in the above-identified patent and that said Letters Patent are hereby corrected as shown below:

Column 3, line 50, in the Table heading second column below "Moles $NH_3$/" should be inserted -- 1000 --.

Column 4, in the Table heading, sixth column "$M^2$/q." should be -- $M^2$/g. --; same Table, fourth column "0.95" should read -- 0.96 --; and same Table fifth column below "1 at 140-155" should be inserted -- .9 at 155-233 --.

Signed and sealed this 27th day of March 1973.

(SEAL)
Attest:

EDWARD M. FLETCHER, JR.                ROBERT GOTTSCHALK
Attesting Officer                      Commissioner of Patents